(12) United States Patent
Bone et al.

(10) Patent No.: US 9,159,023 B2
(45) Date of Patent: Oct. 13, 2015

(54) SYSTEM FOR PREDICTING A DRIVER'S INTENTION TO CHANGE LANES

(75) Inventors: Sven Bone, Munich (DE); Hermann Winner, Bietigheim (DE); Stefan Habenicht, Rossdorf (DE); Jan-Christoph Goos, Bad Wildungen (DE); Fabian Regh, Dolgesheim (DE)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 13/702,218

(22) PCT Filed: Jun. 18, 2010

(86) PCT No.: PCT/JP2010/004102
§ 371 (c)(1),
(2), (4) Date: Dec. 5, 2012

(87) PCT Pub. No.: WO2011/158307
PCT Pub. Date: Dec. 22, 2011

(65) Prior Publication Data
US 2013/0085976 A1   Apr. 4, 2013

(51) Int. Cl.
*G06F 17/00* (2006.01)
*G06N 5/02* (2006.01)
*B60W 30/18* (2012.01)
(Continued)

(52) U.S. Cl.
CPC ........... *G06N 5/02* (2013.01); *B60W 30/18163* (2013.01); *G08G 1/167* (2013.01); *B60W 50/10* (2013.01); *B60W 2550/308* (2013.01)

(58) Field of Classification Search
None
See application file for complete search history.

(56) References Cited

U.S. PATENT DOCUMENTS

| 7,363,140 B2 | 4/2008 | Ewerhart et al. |
| 2004/0158377 A1* | 8/2004 | Matsumoto et al. ............ 701/48 |

(Continued)

FOREIGN PATENT DOCUMENTS

| DE | 10 2005 022 663 A1 | 11/2006 |
| DE | 10 2005 028 370 A1 | 12/2006 |

(Continued)

OTHER PUBLICATIONS

Salvucci "Inferring Driver Intent: A Case Study in Lane-Change Detection", HFES, 2004, pp. 4.*

(Continued)

*Primary Examiner* — Li-Wu Chang
(74) *Attorney, Agent, or Firm* — Westerman, Hattori, Daniels & Adrian, LLP

(57) ABSTRACT

Provided is a system for predicting a driver's intention to change lanes at a high accuracy involving a minimum amount of time delay. A driver's intention to change lanes is predicted by a prediction unit (9) by comparing motivators and inhibitors (7, 8) which may be determined from the speed of the traffic in particular the vehicle traveling ahead of the vehicle and the traffic in the adjacent lanes in relation to the traveling speed of the ego vehicle by using an ego vehicle sensor (1) and an environmental sensor (3, 4, 5) that may comprise a radio wave, optical or acoustic radar. The criteria for the motivators and inhibitors may be empirically or statistically determined, preferably by conducting a large number of tests on roads. As they can be determined before the vehicle operator starts a lane changing maneuver, the prediction made by the prediction unit may be used on a real time basis in a warning system or steering/acceleration assist system.

6 Claims, 10 Drawing Sheets

(51) Int. Cl.
  *G08G 1/16* (2006.01)
  *B60W 50/10* (2012.01)

(56) References Cited

U.S. PATENT DOCUMENTS

| | | | |
|---|---|---|---|
| 2005/0015203 A1* | 1/2005 | Nishira | 701/301 |
| 2005/0131588 A1 | 6/2005 | Kuge et al. | |
| 2005/0131590 A1 | 6/2005 | Kuge et al. | |
| 2005/0267608 A1* | 12/2005 | Nishira et al. | 700/44 |
| 2006/0095193 A1* | 5/2006 | Nishira et al. | 701/96 |
| 2006/0178789 A1 | 8/2006 | Kuge | |
| 2008/0147249 A1 | 6/2008 | Kuge et al. | |
| 2008/0201050 A1 | 8/2008 | Placke | |

FOREIGN PATENT DOCUMENTS

| | | |
|---|---|---|
| DE | 10 2006 043 149 A1 | 3/2008 |
| EP | 1 602 542 A1 | 12/2005 |
| JP | 5-87700 U | 11/1993 |
| JP | 2006-107573 A | 4/2006 |
| JP | 2008-84318 A | 4/2008 |
| JP | 2009/020910 A | 1/2009 |
| JP | 2009-78736 A | 4/2009 |
| JP | 2010-6271 A | 1/2010 |
| JP | 2010-49719 A | 3/2010 |

OTHER PUBLICATIONS

McCall et al. "Lane Change Intent Analysis Using Robust Operators and Sparse Bayesian Learning", IEEE Transactions on Intelligent Transportation Systems, vol. 8, No. 3, 2007, pp. 431-440.*

Japanese Office Action, Japanese Patent Application No. 2012-520173 dated Mar. 18, 2014.

Japanese Office Action, Japanese Patent Application No. 2012-520173 dated Nov. 19, 2013.

Supplementary European Search Report, European Patent Application No. 10853189.8 dated Nov. 13, 2013.

* cited by examiner

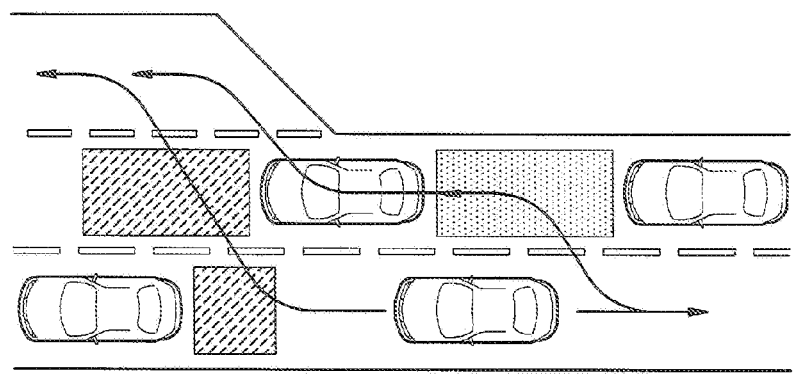
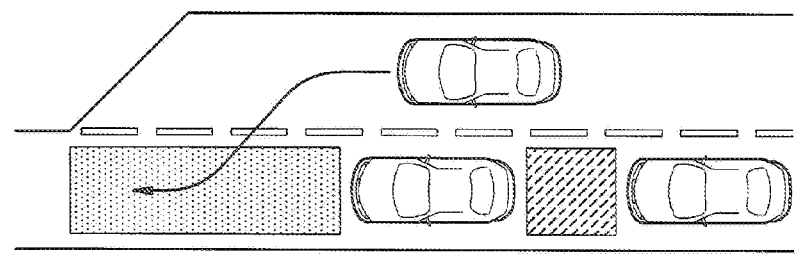
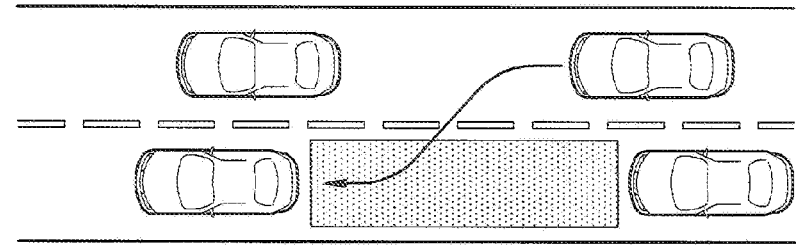

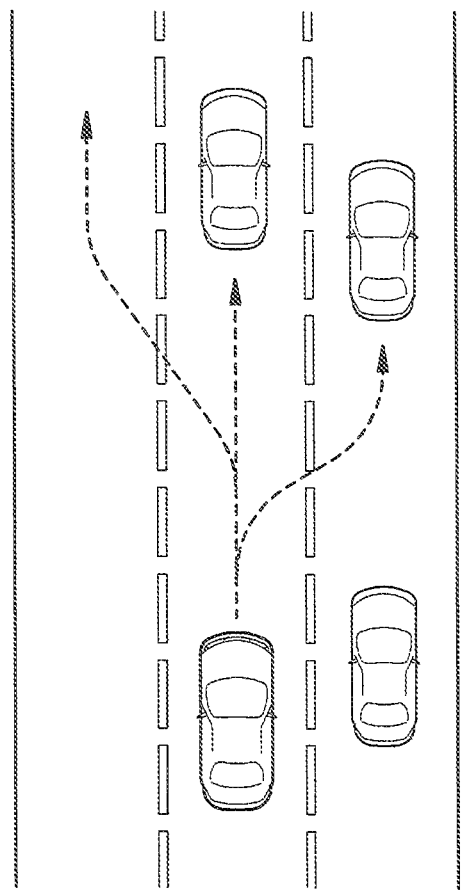

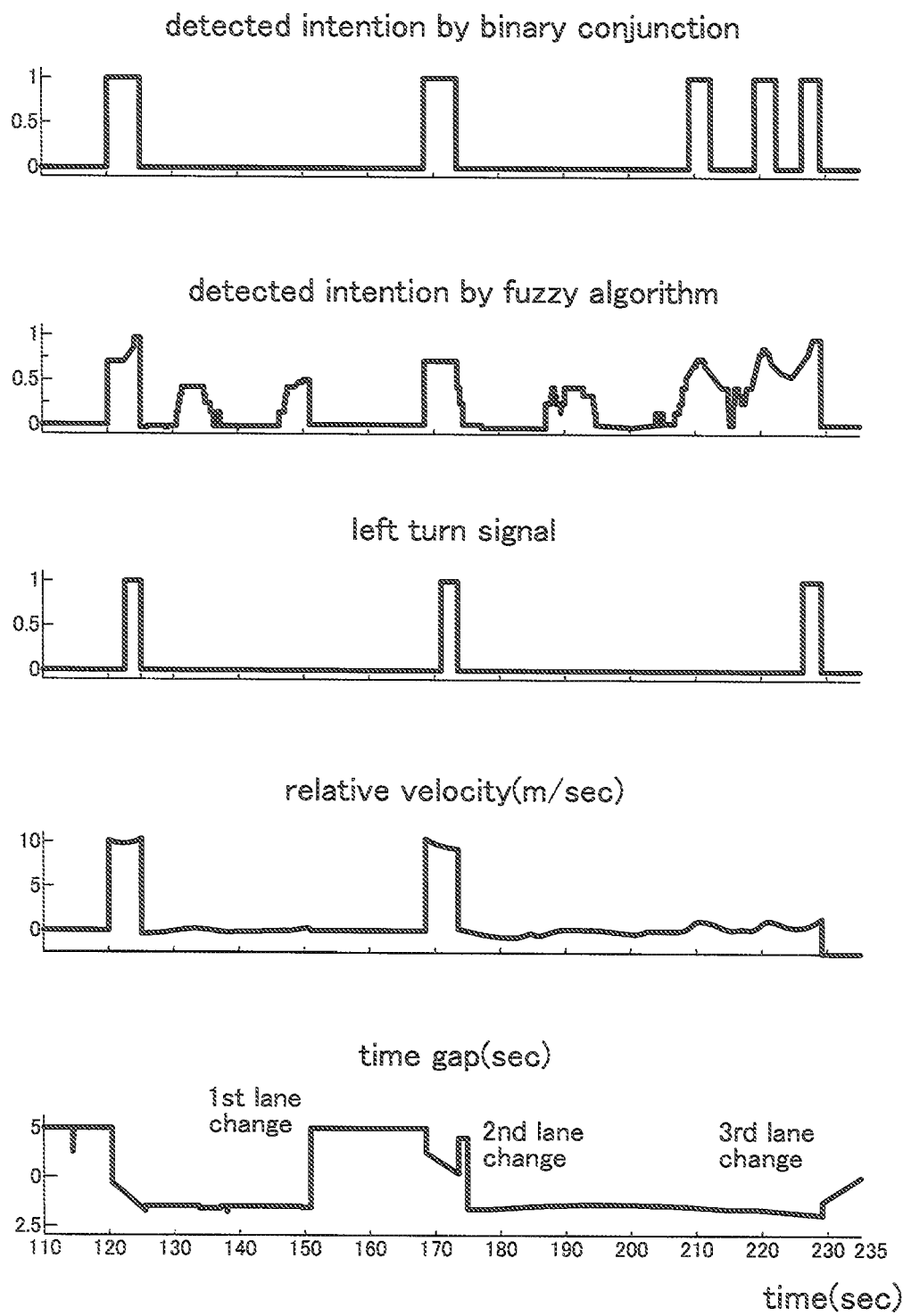

SYSTEM FOR PREDICTING A DRIVER'S INTENTION TO CHANGE LANES

CROSS-REFERENCE TO RELATED APPLICATION

This application is a National Stage entry of International Application No. PCT/JP2010/004102, filed Jun. 18, 2010, the disclosure of the prior application is incorporated in its entirety by reference.

TECHNICAL FIELD

The present invention relates to a system for predicting a driver's intention to change lanes, and in particular to a system for predicting a driver's intention to change lanes that can be used for advanced driver assistance systems (ADAS).

BACKGROUND OF THE INVENTION

Continuous maneuver based advanced driver assistance systems (ADAS), such as a lane change assistance system (LCAS), assist the driver, for example, before and during lane changes. These systems have the risk to act as a nagging guardian for the driver as soon as there is a mismatch between the system support and the driver's intention, and this may unduly annoy the driver. For instance, the driver intends to follow the vehicle ahead on a motorway but LCAS may continuously recommend a lane change maneuver to the left adjacent lane by e.g. haptic, visual, acoustic or active longitudinal/lateral interventions, in order to overtake the vehicle in front. To solve this mismatch between the system and driver behavior the detection of the driver's intention is essential (e.g. left lane change, follow vehicle). This drastically reduces the paternalism of the driver and thus increases the driver's acceptance and the effectiveness of such a system.

Furthermore, to realize a LCAS that analyzes different lane change alternatives (as depicted in FIG. 1), and recommends the best gap (considering safety and comfort aspects) which is in line with the driver's lane change intention, an early driver intention recognition is indispensable.

DE 10 2006 043 149 A1 discloses an integrated transverse and longitudinal guidance assistant for motor vehicles, which has a trajectory calculating unit to calculate a lane change trajectory with a given distance of a vehicle traveling in front. The time to line crossing (TLC) is calculated so that the driver's intention to change lanes may be determined by detecting the driver steering toward the left or right line marker and the TLC being smaller than a certain threshold. However, as the driver's intention to change lanes is detected only after the lane changing maneuver is initiated, the detection of the driver's intention may be too late for most of the ADAS applications. Furthermore, it is necessary that the lane marker must be detected continually.

DE 10 2005 022 663 A1 discloses a vehicle driver assistance method that alerts the vehicle operator by using a voice output when the current lane ends and the vehicle is required to filter into the traffic of the adjacent lane. The lane filtering situation is detected if the lane on which the vehicle is traveling ends. The detection signal controls an acoustic indication such as a voice output and/or visual indicator. This patent document also discloses an apparatus for assisting the vehicle operator in filtering into the traffic of the adjacent lane. The disclosure is however limited to this scenario, and is not transferable to other scenarios.

U.S. Pat. No. 7,363,140 discloses a lane changing assistant for motor vehicles that assists the vehicle operator in finding an available window in the adjacent lane and computing an acceleration strategy adjusted to the window. The lane changing decision is left to the vehicle operator, and the system computes the acceleration strategy when the decision is an acceptable one.

US 2008/0201050 A1 is directed to a system for detecting gaps in an adjacent lane on a multi-lane road. The system provides a human machine interface (HMI) to assist a vehicle operator change lanes. The detection of the vehicle operator's intension is based on a set of driver reactions, such as activation of a turn indicator, and the acceleration and deceleration of the ego vehicle and the distance to the vehicle ahead. As the vehicle operator's intension is detected from the turn indicator and motion of the ego vehicle, the detection of the vehicle operator's intension is necessarily delayed.

The prior art thus fails to provide a system for predicting an intention of a vehicle driver to change lanes which is capable of an adequately early detection to be implemented as an effective part of a ADAS because the prediction is based on the detection of the initiation of a lane changing or overtaking maneuver. If the prediction is based on the detection of available gaps or windows in the adjacent lane, the prediction may be made earlier, but the availability of gaps may not necessarily means that the vehicle driver wishes to change lanes.

The prior art, even if it is configured to detect a driver's intention to change lanes, focuses only on one factor as a criterion that determines the intention of the driver to change lanes. In view of this limitation of the prior art, the inventors have realized that a vehicle driver snakes a lane changing or overtaking decision based on a number of factors (motivators and inhibitors), such as:

Slow vehicle driving ahead
Decelerating vehicles driving ahead
Faster vehicle approaching from behind
End of lane
Obligation to drive on left or right lane (depending on left- or right-hand-traffic)
Narrow lane (e.g. during road works)
Lane changes due to selected route (e.g. provided by navigation system).

Thus, there is a need to solve the problems described above, and provide an early and reliable driver intention recognition or prediction which accounts for a plurality of reasons for lane change/overtaking maneuvers and decisions.

BRIEF SUMMARY OF THE INVENTION

In view of such problems of the prior art and the recognition by the inventors, a primary object of the present invention is to provide a system for predicting a driver's intention to change lanes which involves a minimum amount of time delay between the first occurrence of the driver's intention and the predicted intention.

A second object of the present invention is to provide a system for predicting a driver's intention to change lanes at a high accuracy.

According to the present invention, such objects can be at least partly accomplished by providing a system for predicting a driver's intention to change lanes, comprising: an ego vehicle sensor for detecting information on a motion of an ego vehicle; an environment sensor for detecting information on a motion of a vehicle traveling within a prescribed distance ahead of the vehicle in a same lane as the ego vehicle and/or on a motion of a vehicle traveling within a prescribed distance from the ego vehicle in an adjacent lane; a motivator computing unit for computing a motivator indicating a driver's intention to change lanes from the current lane to the adjacent lane according to outputs of the ego vehicle sensor and environment sensor; an inhibitor computing unit for computing an inhibitor indicating a driver's intention not to change lanes from the current lane to the adjacent lane according to the outputs of the ego vehicle sensor and environment sensor; and a prediction unit for predicting the driver's intention to change lanes by comparing outputs of the motivator computing unit and inhibitor computing unit. The environment sensor may comprise a radio wave, optical or acoustic radar.

The motivators and inhibitors may be determined from the speed of the traffic in particular the vehicle traveling ahead of the vehicle and the traffic in the adjacent lanes in relation to the traveling speed of the ego vehicle. The criteria for the motivators and inhibitors may be empirically or statistically determined, preferably by conducting a large number of tests on roads. As they can be determined before the vehicle operator starts a lane changing maneuver, the prediction made by the prediction unit may be used on a real time basis in a warning system or steering/acceleration assist system. By improving the accuracy of the motivators and inhibitors, the system is prevented from being excessively paternalistic.

A maneuver of the vehicle operator that is indicative of an intention to change lanes provides a relatively accurate prediction of the driver's intention to change lanes although the prediction may be too late for some purposes. Therefore, the prediction unit may be enabled to provide an improved prediction when an indicator indicative of a driver's intention to change lanes from the current lane to the adjacent lane from an output of the ego vehicle sensor is additionally taken into account.

According to a preferred embodiment of the present invention, the motivator computing unit is configured to determine if any of a plurality of motivator criteria are met, and the inhibitor computing unit is configured to determine if any of a plurality of inhibitor criteria are met, the prediction unit predicting the driver's intention to change lanes by comparing a weight of the motivator criteria that are met with a weight of the inhibitor criteria that are met.

The prediction unit may use a binary conjunction, a fuzzy logic conjunction or any other weight comparing algorithm in comparing the weight of the motivator criteria that are met with the weight of the inhibitor criteria that are met. The weight as used herein may include, not exclusively, the number of factors, a weighted total of the number of factors or any other quantitative measures of factors.

BRIEF DESCRIPTION OF THE DRAWINGS

Now the present invention is described in the following with reference to the appended drawings, in which:

FIGS. 1a to 1c are diagrams illustrating three different lane changing patterns;

FIG. 2 is a similar diagram illustrating two possible lane changing intensions:

FIG. 9 is a graph illustrating how lane changing predictions are made by using the binary conjunction device and fuzzy logic conjunction device in the different scenarios.

DETAILED DESCRIPTION OF THE PREFERRED EMBODIMENTS

The system embodying the present invention and described in the following enables an early and reliable detection of the driver's lane change/overtaking intention in order to realize a maneuver based ADAS which supports the driver before and during lane changes. In addition, the system takes into account a plurality of different reasons or factors for lane change/overtaking maneuvers.

FIGS. 1a to 1c show different modes of lane changing maneuver. FIG. 1a illustrates a case where an ego vehicle traveling in the current lane changes to the adjacent lane, typically because the other vehicle traveling ahead of the ego vehicle is slower. FIG. 1b illustrates a case where the ego vehicle changes the current lane to the adjacent lane to filter into the traffic of the adjacent lane because the current lane is about to end. FIG. 1c shows a case where the ego vehicle merges with the traffic of the adjacent slower lane, and then exits the slow lane to an exit road. In any of the situations, it is necessary that a window is available in the next lane for the ego vehicle to swing into, and the speed of the ego vehicle is adjusted to the speed of the traffic in the next lane.

In any of these situations, the vehicle operator has a choice to change the current lane to the right lane or to the left lane and to stay in the current lane as illustrated in FIG. 2. The ego vehicle may travel at a speed chosen by the vehicle operator or at a same speed as that of the vehicle traveling ahead. The present invention may provide an assistance to the vehicle operator before and/or during lane change situations not only in lateral directions but also in longitudinal directions. By adjusting the speed of the ego vehicle, for instance, to that of the traffic in the adjacent lane, the window existing in the adjacent lane can be effectively utilized by the ego vehicle. In particular, according to a certain aspect of the present invention, the assistance to the vehicle operator is offered only when the vehicle operator's intention to change lanes and overtake the vehicle traveling ahead is predicted. Thereby, the system is prevented from being excessively paternalistic, and from annoying the vehicle operator. Also, the vehicle operator is prevented from being annoyed by warnings and urgings of the system to change lanes in case the vehicle operator has no intention to perform a lane changing/overtaking maneuver. Thus, the associated ADAS is made more acceptable to the vehicle operator, and more efficient in the operation thereof.

Figure 3A:
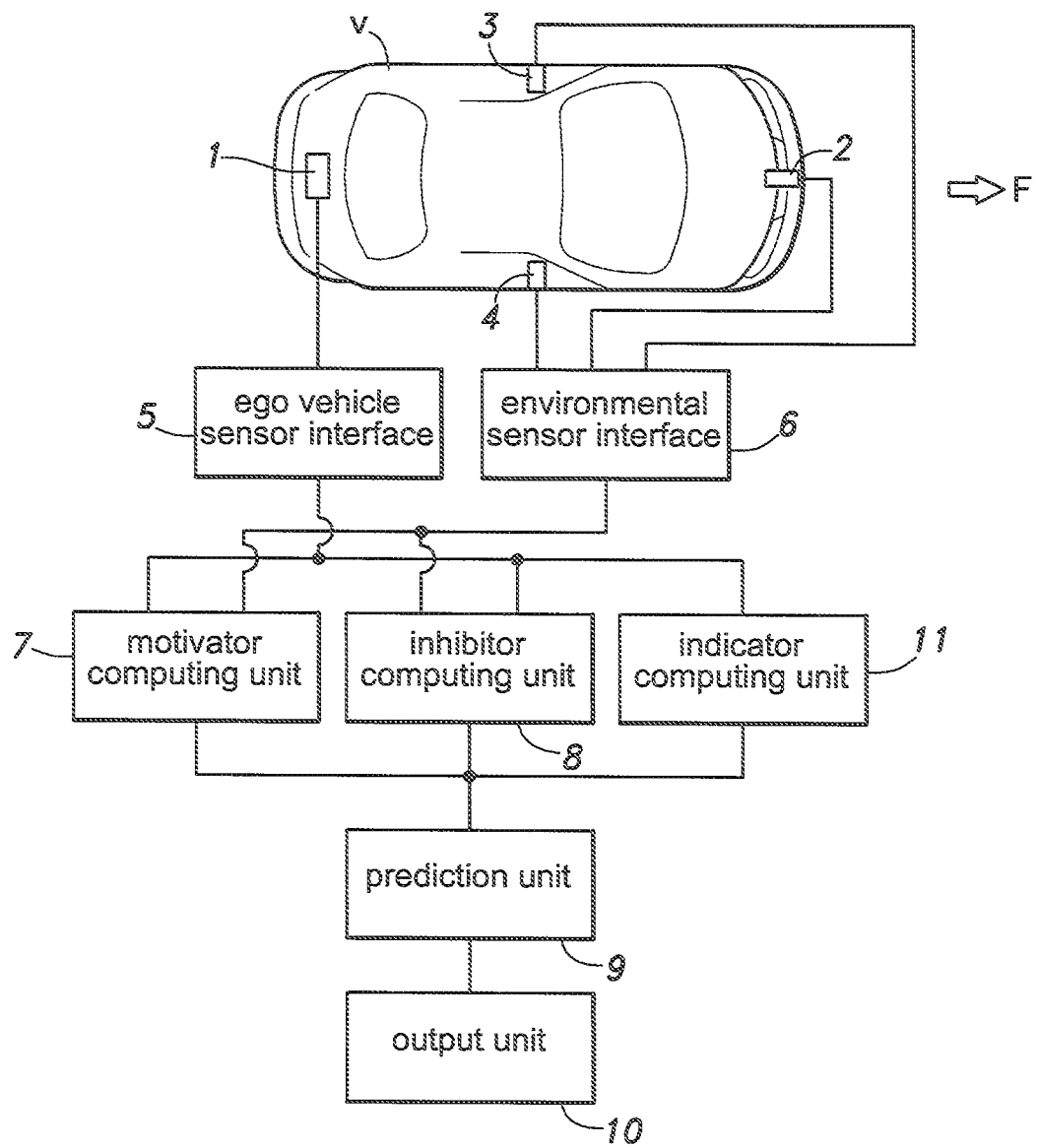
FIG. 3a is a block diagram of a system for predicting a driver's intention to change lanes embodying the present invention.
Figure 3B:
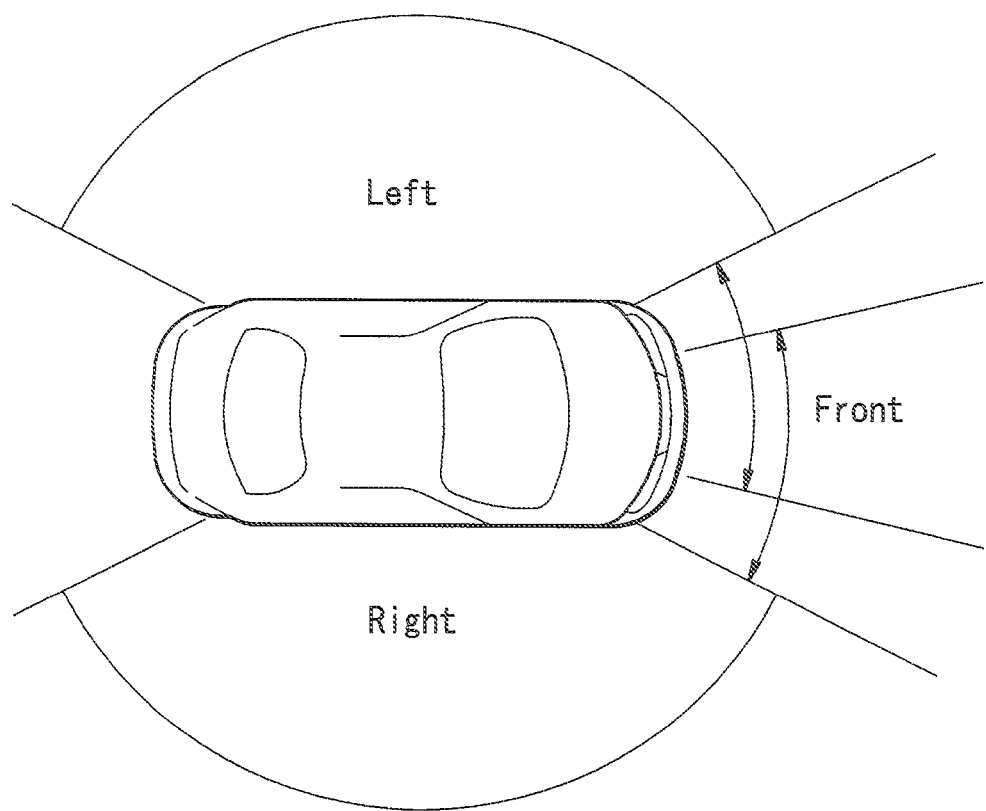
FIG. 3b is a plan view showing ranges of onboard radars.
Figure 4A:
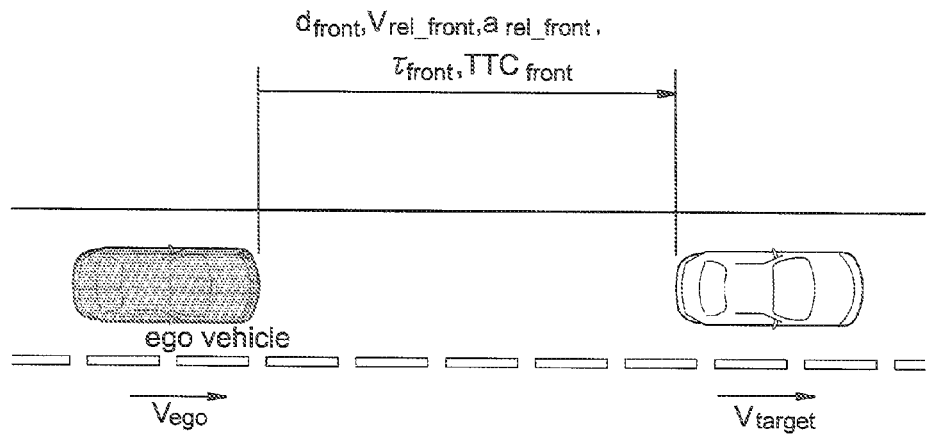
FIGS. 4a and 4b are diagrams illustrating parameter definitions for a lane change to a faster (left) lane.
Figure 4B:
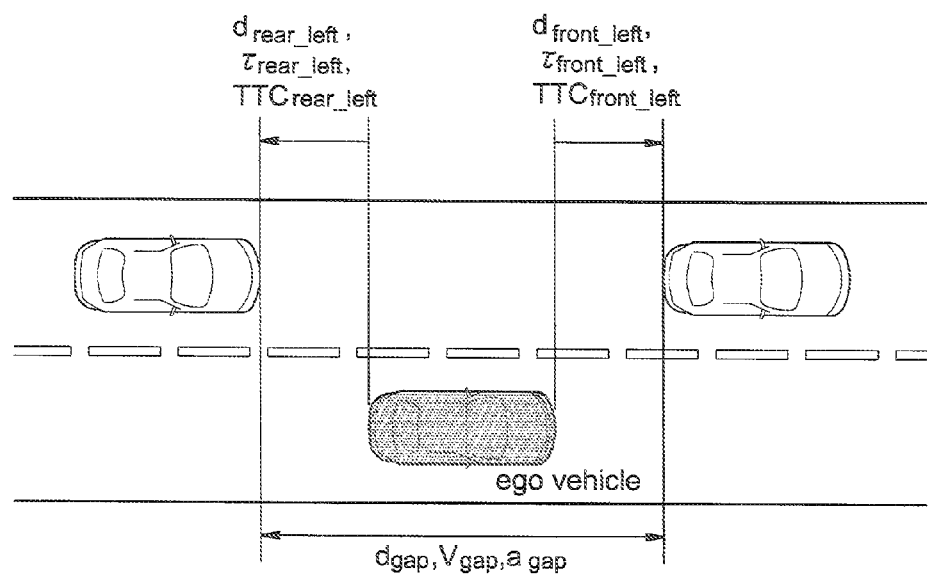

FIG. 3a shows the structure of the invention. The vehicle V is equipped with a ego sensor unit 1 which is configured to detect dynamic variables of the vehicle V such as a traveling speed, a lateral speed, a yaw rate, a longitudinal acceleration, a lateral acceleration, etc., and an environmental sensor unit which may include a front radar 2, a left radar 3 and a right radar 4 to detect not only the presence of other vehicles around the ego vehicle V but also the speeds of the other vehicles. The environmental sensor may additionally include a rear radar if the particular application requires one. FIG. 3b shows the coverage of the three radars, The outputs from these sensors are forwarded to a motivator computing unit 7 and an inhibitor computing unit 8 via an ego vehicle sensor interface 5 and environmental sensor interface 6, respectively. The motivator computing unit 7 computes motivators that are expected to induce or otherwise cause the vehicle operator to change lanes, and the inhibitor computing unit 8 computes inhibitors that are expected to induce or otherwise cause the vehicle operator to keep the current lane, from the dynamic variables of the ego vehicle V detected by the ego sensor unit and the states of surrounding vehicles detected by the environmental sensor unit as will be described hereinafter.

The outputs of the motivator computing unit 7 and inhibitor computing unit 8 are forwarded to a prediction unit 9 which may consist of a binary conjunction device or a fuzzy logic conjunction device as will be described hereinafter. An output of the prediction unit 9 is forwarded to an output unit 10 that informs a linked ADAS the driver's lane change intention as soon as it is predicted. The output can be either two Boolean or two likelihood values indicating the driver's intention to change to the left or right adjacent lane. The system may optionally include an indicator computing unit 11 that detects the vehicle operator's intension to change lanes from the ego sensor unit 5 which may be configured to detect an activation of a turn signal and various dynamic variables (such as a steering angle, lateral and longitudinal accelerations and yaw rate) of the ego vehicle.

Parameter Definitions for Lane Changes to a Faster Left Lane

For the realization of a driver intention detection system that detects lane change intentions to a faster left lane, at least the following signal inputs are required (shown in Table 1).

TABLE 1

| signal | | unit | signal source | measured/calculated |
|---|---|---|---|---|
| velocity | $V_{ego}$ | m/s | wheel speed sensors | measured |
| distance | $d_{front}$ $d_{front\_left}$ | m | front radar | measured |
| relative velocity | $V_{rel\_front}$ $V_{rel\_front\_left}$ | m/s | front radar | measured |
| time gap | $\tau_{front}$ $\tau_{front\_left}$ | s | | $\tau = d/V_{ego}$ |
| time to collision | $TTC_{front}$ $TTC_{front\_left}$ | s | | $TTC = d/V_{rel}$ |
| time of uninfluenced driving | $t_{uninfluenced\_front}$ | s | front radar | calculated from $\tau$ and TTC |

To improve the performance and reliability of the system, the following optional input signals may also be used.

TABLE 2

| signal | | unit | signal source | measured/calculated |
|---|---|---|---|---|
| distance | $d_{rear}$ $d_{rear\_left}$ | m | front radar | measured |
| relative velocity | $V_{rel\_rear}$ $V_{rel\_rear\_left}$ | m/s | front radar | measured |
| relative acceleration | $a_{rel\_front}$ $a_{rel\_front\_left}$ $a_{rel\_rear}$ $a_{rel\_rear\_left}$ | m/s² | front/rear radar | computed from $V_{rel}$ |
| time gap | $\tau_{rear}$ $\tau_{rear\_left}$ | s | | $\tau = d/V_{ego}$ |
| time to collision | $TTC_{rear}$ $TTC_{rear\_left}$ | s | | $TTC = d/V_{rel}$ |
| average ego lane velocity | $V_{lane\_ego}$ | m/s | front radar | calculated from $V_{rel}$ |
| average left lane velocity | $V_{lane\_left}$ | m/s | front/rear radar | calculated from $V_{rel}$ of left adjacent lane |

TABLE 2-continued

| signal | | unit | signal source | measured/calculated |
|---|---|---|---|---|
| driver's desired velocity | $V_{desired}$ | m/s | ACC set-speed or wheel speed sensors | ACC set-speed or calculated from average ego vehicle speed |
| maximum velocity | $V_{ego\_max}$ | m/s | calibration parameters, camera, map data | calculated from power, rolling resistance, mass, drag coefficient, velocity, traffic sign recognition |
| maximum acceleration | $a_{ego\_max}$ | m/s² | calibration parameters | calculated from power, rolling resistance, mass, drag coefficient, velocity |
| left lane existence | $p_{lane\_left}$ | n/a | camera or radar | calculated from stationary radar objects or camera image |
| lane width | $d_{lane\_width}$ | m | camera | calculated from camera image |
| merging lane existence | $p_{merge\_lane}$ | n/a | camera, map data | calculate of end of lane from camera image or exact map data from navigation system |
| no passing signs | $p_{passing}$ | n/a | camera, map data | traffic sign recognition |

Parameter Definitions for Lane Changes to a Slower Right Lane

For the realization of a driver intention detection system that detects lane change intentions to a slower right lane, at least the following signal inputs are required (shown in Table 3). These signals are additionally required to the signals described in connection with Table 1.

TABLE 3

| signal | | unit | signal source | measured/calculated |
|---|---|---|---|---|
| average right lane velocity | $V_{lane\_right}$ | m/s | front/rear radar | calculated from $V_{rel}$ of right adjacent lane |
| time of uninfluenced driving on right adjacent lane | $t_{uninfluenced\_right}$ | s | front/rear radar | calculated from right adjacent gap size, position, $\tau$ and TTC |

To improve the performance and reliability of the system, the following optional input signals may also be used.

TABLE 4

| signal | | unit | signal source | measured/calculated |
|---|---|---|---|---|
| distance | $d_{rear\_right}$ | m | rear radar | measured |
| relative velocity | $V_{rel\_rear\_right}$ | m/s | rear radar | measured |
| time gap | $\tau_{rear\_right}$ | s | | $\tau = d/V_{ego}$ |
| time to collision | $TTC_{rear\_right}$ | s | | $TTC = d/V_{rel}$ |
| speed limit sign | $p_{speed\_limit}$ | n/a | camera, map data | traffic sign recognition |
| right lane existence | $p_{lane\_right}$ | n/a | camera or radar sensor | calculated from stationary radar objects or camera image |

The driver's intention is estimated based on three parameter sets as listed below. The conjunction device combines these parameters and determines the probability of a lane change/overtaking maneuver.

Motivators
Inhibitors
Indicators

Motivators increase the likelihood of the driver's lane change intention whereas inhibitors decrease the likelihood of the driver's lane change intention. The following measurable parameters are included:

The average velocity of a lane can be determined based on the traffic on these lanes. If the average velocity of the adjacent lane is greater than the average velocity of the current lane, the driver will intend to change to the faster lane.

If there is no vehicle on the right lane in case of right-hand-traffic, the probability of the driver's lane change intention will increase depending on the length of this section (obligation to drive on left or right side depending on left- or right-hand-traffic rules).

If the driver's desired velocity is greater than the current velocity, e.g. limited by a vehicle driving ahead, the driver will intend to change to the faster lane. If the current velocity is greater than the driver's desired velocity, the driver will intend to change to the slower lane. The desired velocity can be taken from the ACC set-speed directly or estimated by analyzing the driving profile for a certain period of time.

A short distance to a vehicle ahead increases the lane change probability.

A declining time-to-collision (TIC) indicates an increased lane change probability.

With an increasing predicted period of uninfluenced driving, without adjusting the velocity to the surrounding traffic, the lane change probability decreases, if the period of uninfluenced driving increases for the right lane, the probability to change to that lane will increase.

The type of vehicle directly influences the lane change probability. A vehicle with a low maximum velocity or power (e.g. truck or bus) increases the lane change probability.

Indicators are observable parameters of the driver behavior, mostly ego vehicle characteristics indicating that the driver has a strong intention to execute e.g. a lane change/overtaking maneuver, or to stay in the current lane. Indicators confirm the detected/estimated driver's lane change likelihood.

An analysis of the vehicle motion/trajectory within the own lane, e.g. expressed as the time-to-line-crossing (TLC), enables the short term detection of the driver's lane change intention.

A strong steering activity as well as a change of the relative yaw angle between the ego vehicle and the current lane trajectory indicates an imminent lane change/overtaking maneuver.

The left/right turn indicators indicate an imminent lane change/overtaking maneuver.

Figure 6:
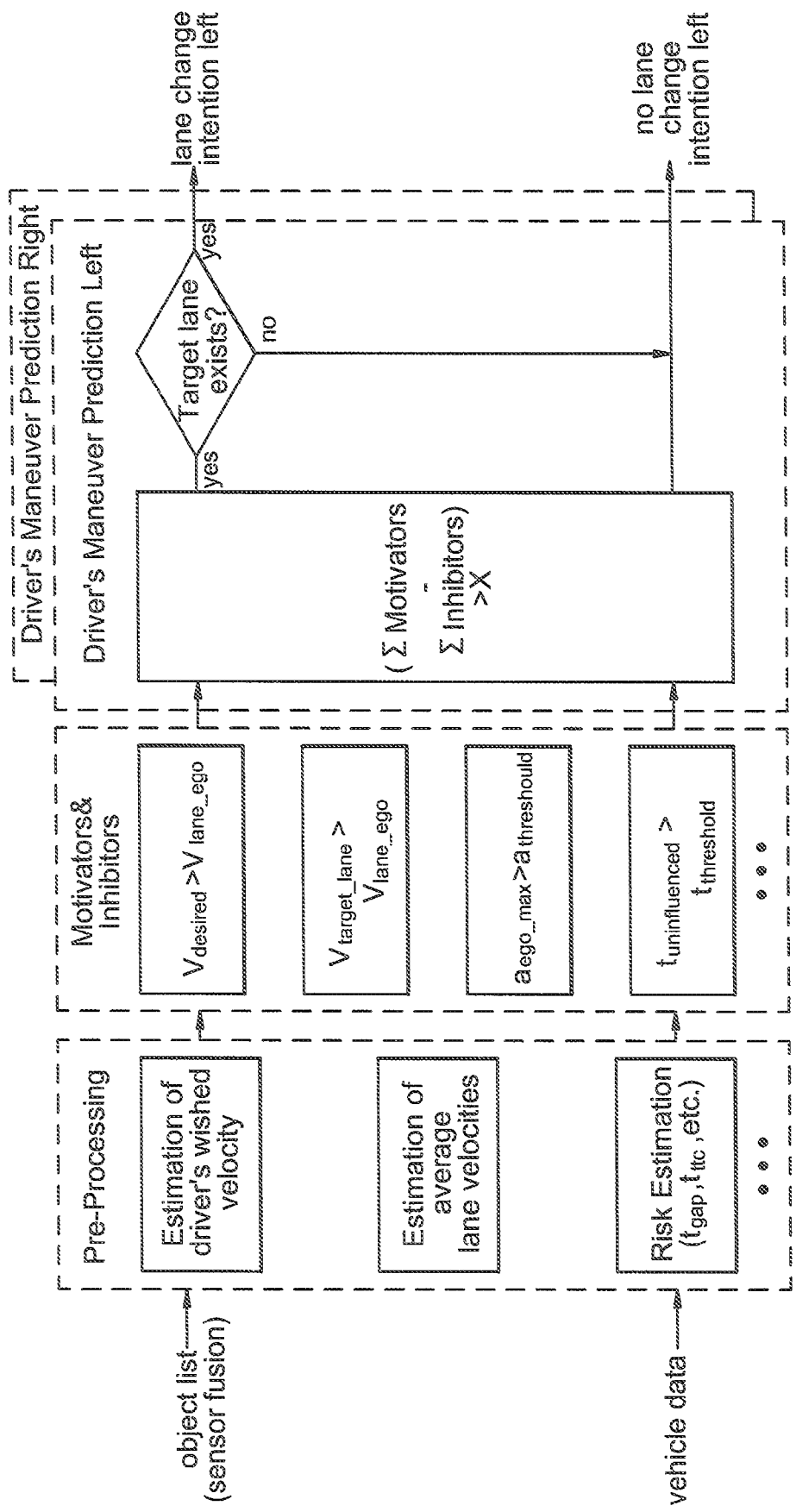
FIG. 6 is a flowchart illustrating a decision making process using a binary conjunction device.

The motivators and inhibitors may be evaluated in various different manners. Typically, a measure or weight of the motivator or motivators is compared with that of the inhibitor or inhibitors, and a prediction may be made based upon this comparison. The following conjunction methods are possible candidates for performing this comparison:

Fuzzy Logic
Binary Conjunction
Neural Networks
Support Vector Machines
Markov Process
Bayesian Networks
State Machine FIG. 6 shows a system using a binary conjunction in conjunction with an exemplary subset of input parameters. Thereby, the parameters like the driver's desired velocity, the ego velocity, the velocity of vehicle ahead, the velocity of vehicles driving on target lane, the acceleration ability and the time gap are considered. In case the inequality comparing the motivator with the inhibitor is true, a motivator criterion exists, and otherwise an inhibitor criterion exists. As soon as the difference between the number of motivator and inhibitor criteria exceeds a threshold X and an adjacent lane exists, the driver intents to change the lane.

Figure 7:
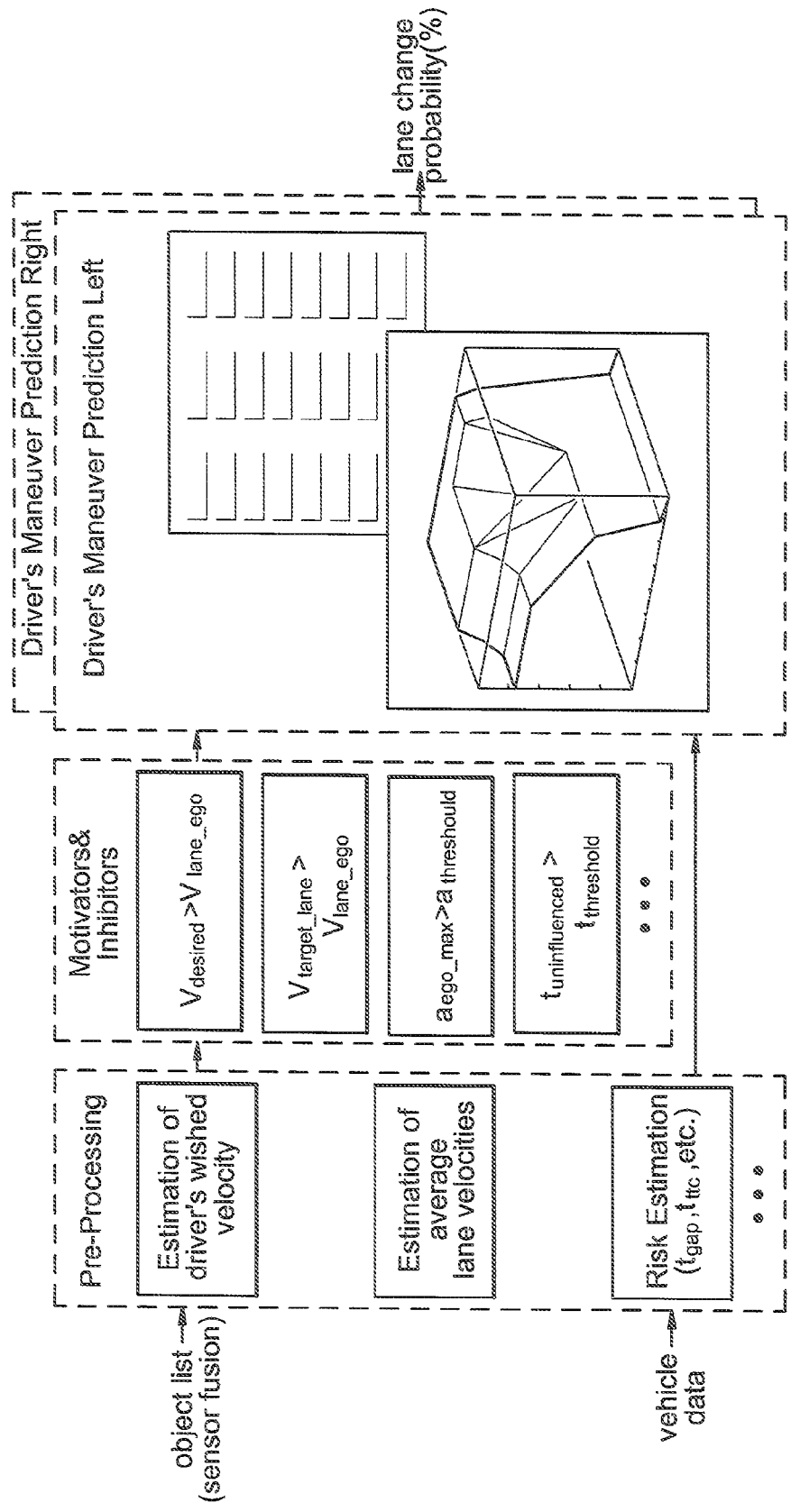
FIG. 7 is a flowchart illustrating a decision making process using a fuzzy logic conjunction device.

Another approach to combine the parameters can be realized with the help of fuzzy logic. FIG. 7 shows a system using a fuzzy logic conjunction. Only the conjunction device has to be exchanged by the fuzzy logic conjunction in FIG. 6. The pre-processing, motivator and inhibitor blocks are the same as used in the binary conjunction method.

Some exemplary fuzzy rules are described below:

If the differential velocity to a vehicle driving ahead is HIGH AND the driver's desired velocity is greater than the velocity of the vehicle ahead, the probability of the driver's lane change intention will be VERY HIGH.

If the accelerating ability is VERY SMALL the probability of the driver's lane change intention will be SMALL.

If the time gap to a vehicle driving ahead is VERY SMALL the probability of the driver's lane change intention will be HIGH.

If the ego vehicle's performance is HIGH AND a truck is driving ahead, the probability of the driver's lane change intention will be HIGH.

If the ego vehicle's width compared to the lane width is HIGH AND the adjacent lane with is greater than the current ones the probability of the driver's lane change intention will be HIGH.

To validate the driver's lane change intention detection methods two methods have been applied. The binary conjunction and the fuzzy logic conjunction method are realized in a simulation environment and additionally running in a real test car in real-time. First trials have been conducted on German Autobahn A3 between Frankfurt and Würzburg as depicted in FIG. 8. The realized sensor setup allows a 360° environment sensing. However, for later series projects one front sensor like the already existing ACC/CMBS radar sensor mount on Honda Acura RL (tradename) and optionally two side sensors for the blind spot as used for e.g. for blind sport information systems (BSI) fulfill all requirements for both detection methods.

Figure 5A:
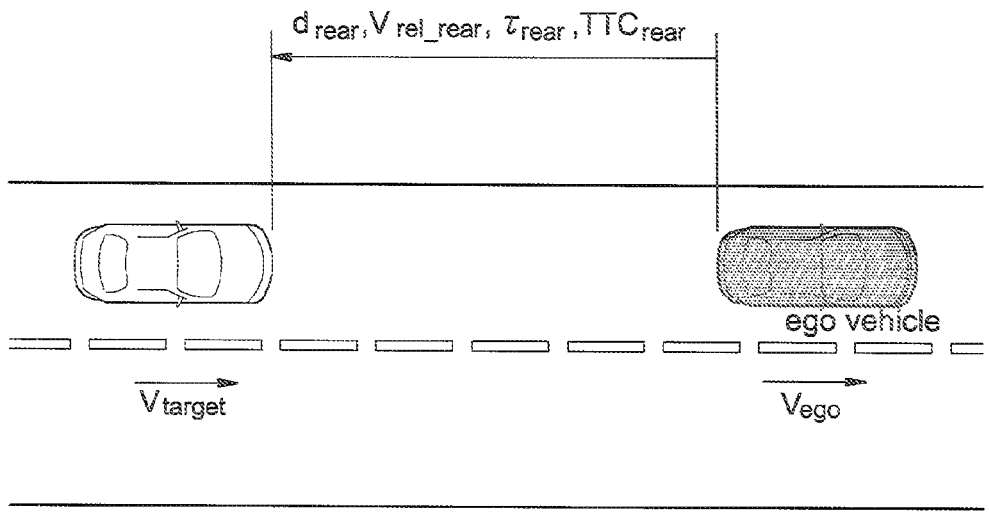
FIGS. 5a and 5b are diagrams illustrating parameter definitions for a lane change to a slower (right) lane.
Figure 5B:
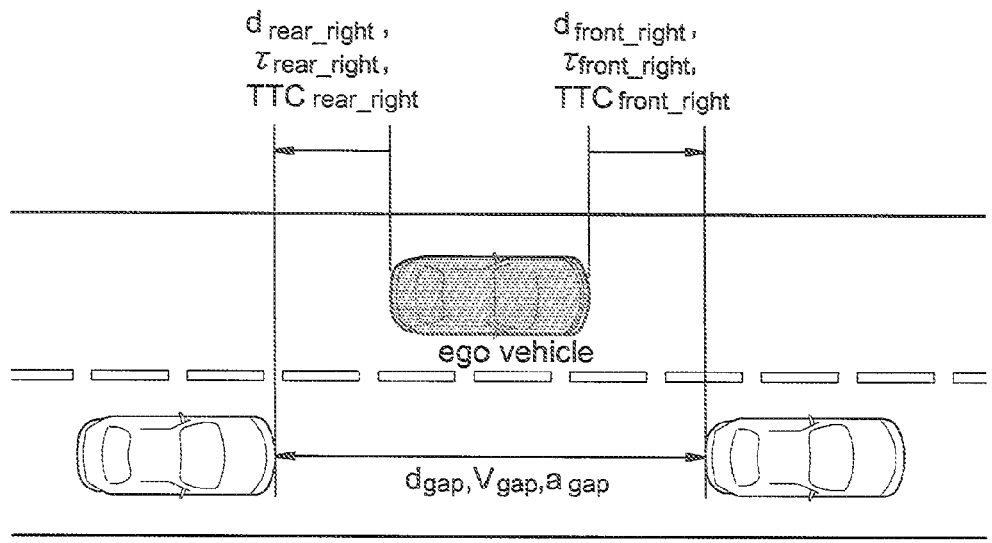

With the help of the test car more than 400 different lane changes have been recorded on different German motorways with 10 subject drivers. Each subject driver was asked to drive normally without any specific task. In this representative extraction the subject performed three lane changes (depicted in FIG. 9). The first two lane changes took place after approaching to a slower vehicle driving ahead in one's own lane (scenarios depicted in FIGS. 8a and 8b). In the last scenario depicted in FIG. 5c, the driver overtook a vehicle traveling immediately ahead of the ego vehicle after following it for a while. The results of the detected lane change intentions are described in detail in the following based on this representative extraction of the measured data.

The upper two graphs in FIG. 9 represent the results of the binary and the fuzzy logic conjunction methods and exemplary show some of the used input signals. The binary conjunction method's output signal could be either "0" or "1". The output "0" means no left lane change intention detected, whereas the output "1" indicates a left lane change intention of the driver. The fuzzy logic conjunction method outputs a percentage value between 0 and 100%. The value indicates the probability of a left lane change. In the third graph from the top, the status of the left turn signal is shown. This signal is used as a baseline in order to compare and validate both methods and it is not an input signal of the lane change detection algorithms. The forth graph contains the relative velocity to the vehicle ahead and the bottom graph shows the corresponding time gap ($\tau = d/v_{ego}$).

Figure 8A:
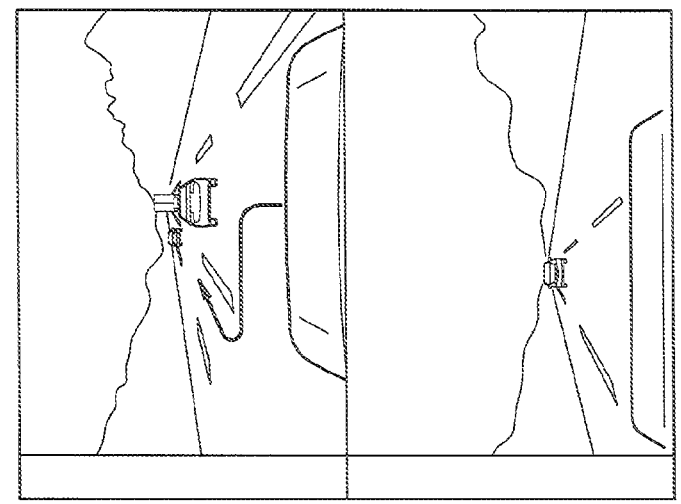
FIGS. 8a to 8c show front and rear views as seen from an ego vehicle in three different lane changing scenarios.

As depicted in scenario 1 in FIG. 8a, the driver performed the first lane change after approaching a vehicle driving ahead. FIG. 9 shows the situation at 121 seconds. The driver's left lane change intention is detected by both algorithms approximately 2.3 seconds before the driver set the left turn signal. The intensity of the lane change intention increases with the reduction of the distance and thus a shorter time gap. The relative velocity of approximately 10 m/s is comparatively high. After starting the overtaking maneuver, the vehicle leaves the lane and a new object is selected by the radar sensor as the relevant vehicle in one's own lane. The intention recognition is set back to zero which indicates no lane change intention.

Figure 8B:
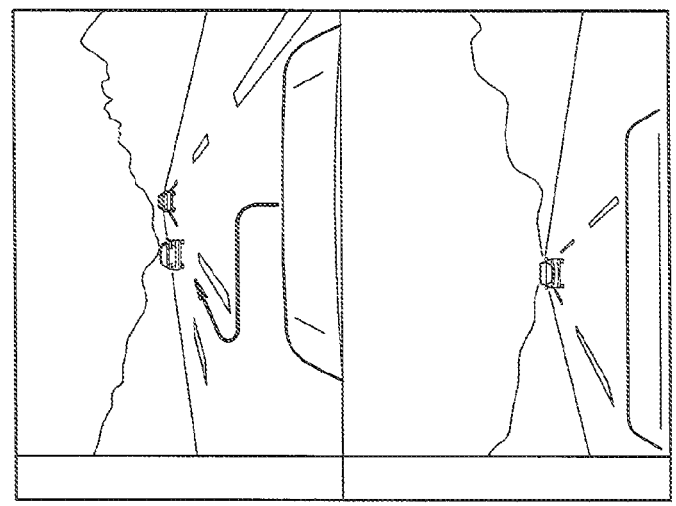

The situation before the second lane change is displayed in scenario 2 of FIG. 8b and FIG. 9 at 167 seconds. Both algorithms detect the driver's left lane change intention 3 seconds before the turn signal had been activated by the driver. The situation is comparable with scenario 1. The only difference is the distance between the ego vehicle and the vehicle ahead. The distance is greater and thus the time gap is longer compared to scenario 1. For this reason the fuzzy logic conjunction algorithm detects a lower intention level of approximately ~70%. Nevertheless, this value is still sufficient to indicate the left lane change intention. Shortly after the overtaking maneuver, the time gap changes quickly to a lower level because a faster vehicle on the new ego lane is detected as the new relevant vehicle by the radar sensors. Thus both conjunction algorithms returned back to zero which indicates no lane change intention.

Between 175 s and 207 s the driver is following the vehicle in front. The time gap in FIG. 9 is continuously on a low level of $\tau \approx 1.2$ s. The driver has no urgent intention to perform a lane change in order to overtake the van. The fuzzy logic algorithm detects a low lane change intention ≤40% three times before the next lane change scenario at 207 s. These values are below the threshold of 50% and therefore no left lane change intention is given.

Figure 8C:
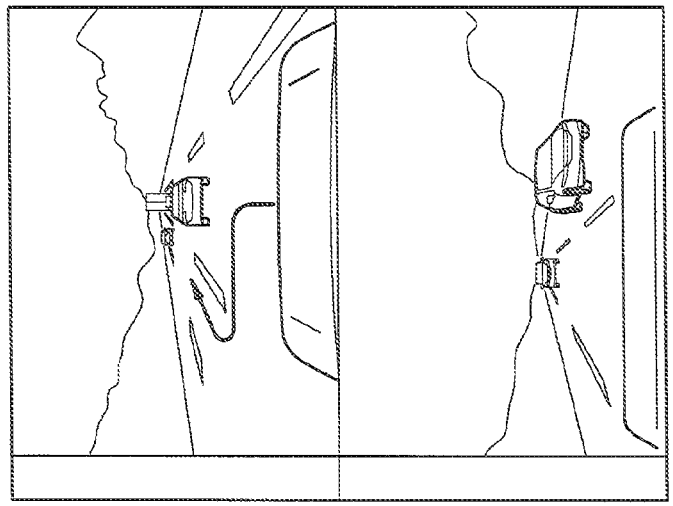

At 207 seconds, the driver started to consider overtaking the vehicle and thus changing to the left lane. The intention level of the fuzzy logic conjunction method increases. Two seconds later, at 209 seconds, the binary conjunction method detects the lane change intention, too. The descending slope of the fuzzy intention signal at 212 seconds and the fluctuating output signal of the binary intention algorithm occurred because the driver intended to change the lane but recognized a faster car approaching from behind (as depicted in FIG. 8c scenario 3). The driver let the car pass before performing his left lane change/overtaking maneuver. The initial lane change intention has been recognized approximately 20 seconds before the driver set the left turn signal. This timing is sufficient to avoid a possible accident by a warning or an active intervention (e.g. braking, steering) in case the driver had not recognized the car in the rear.

Both methods, the binary and the fuzzy logic conjunction method, use state of the art input signals (e.g. radar data used by Honda's ACC/CMBS, wheel speed sensors, etc.) which are already available in today's vehicles, in order to detect the driver's lane change intention. The driver's intention is detected between 2.3 up to 20.0 seconds before the driver activates the turn signal. In contrast to state of the conventional algorithms, this invention enables an early detection of the driver's lane change intention even if the driver does not set the turn signal at all. Exactly this behavior is required to realize an advanced driver assist systems (ADAS) with an early intervention (e.g. warning, haptic feedback, braking or steering) in order to avoid critical lane change/overtaking scenarios in advance.

Although the present invention has been described in terms of preferred embodiments thereof, it is obvious to a person skilled in the art that various alterations and modifications are possible without departing from the scope of the present invention which is set forth in the appended claims.

The contents of the prior art references mentioned in this application are incorporated in this application by reference.

The invention claimed is:

1. A system for predicting a driver's intention of an ego vehicle to change lanes, comprising:
    an ego vehicle sensor for detecting information on a motion of the ego vehicle;
    an environment sensor for detecting information on at least one of:
        a motion of a vehicle traveling within a prescribed distance ahead of the ego vehicle in a same lane as the ego vehicle, and
        a motion of a vehicle traveling within a prescribed distance from the ego vehicle in an adjacent lane;
    a motivator computing unit for computing a motivator indicating an intention of a driver of the ego vehicle to change lanes from the current lane to the adjacent lane according to outputs of the ego vehicle sensor and environment sensor, wherein the driver is a human driving the ego vehicle;
    an inhibitor computing unit for computing an inhibitor indicating an intention of the driver of the ego vehicle not to change lanes from the current lane to the adjacent lane according to the outputs of the ego vehicle sensor and environment sensor; and
    a prediction unit for predicting the driver's intention of the ego vehicle to change lanes by comparing outputs of the motivator computing unit and inhibitor computing unit,
    wherein the motivator computing unit is configured to determine if any of a plurality of motivator criteria for the intension of the driver of the ego vehicle are met, and the inhibitor computing unit is configured to determine if any of a plurality of inhibitor criteria for the intension of the driver of the ego vehicle are met, the prediction unit predicting the driver's intention to change lanes by comparing a number of the motivator criteria that are met with a number of the inhibitor criteria that are met, and
    wherein the outputs of the ego vehicle sensor used in computing the motivator and the inhibitor include only the outputs indicating the motion of the ego vehicle in a longitudinal direction of the ego vehicle, including a traveling speed and a longitudinal acceleration of the ego vehicle.

2. The system for predicting a driver's intention of an ego vehicle to change lanes according to claim 1, further comprising an indicator computing unit for computing an indicator indicative of the driver's intention to change lanes from the current lane to the adjacent lane from the outputs of the ego vehicle sensor, the prediction unit using an output of the indicator computing unit in predicting the driver's intention to change lanes.

3. The system for predicting a driver's intention of an ego vehicle to change lanes according to claim 1, wherein the environment sensor comprises a radio wave, optical or acoustic radar.

4. The system for predicting a driver's intention of an ego vehicle to change lanes according to claim 1, wherein the motivator includes a predicted period of uninfluenced driving of the ego vehicle and the inhibitor includes the predicted period of uninfluenced driving of the ego vehicle.

5. A system for predicting a driver's intention of an ego vehicle to change lanes, comprising:
an ego vehicle sensor for detecting information on a motion of the ego vehicle;
an environment sensor for detecting information on at least one of:
a motion of a vehicle traveling within a prescribed distance ahead of the ego vehicle in a same lane as the ego vehicle, and
a motion of a vehicle traveling within a prescribed distance from the ego vehicle in an adjacent lane;
a motivator computing unit for computing a motivator indicating an intention of a driver of the ego vehicle to change lanes from the current lane to the adjacent lane according to outputs of the ego vehicle sensor and environment sensor, wherein the driver is a human driving the ego vehicle;
an inhibitor computing unit for computing an inhibitor indicating an intention of the driver of the ego vehicle not to change lanes from the current lane to the adjacent lane according to the outputs of the ego vehicle sensor and environment sensor; and
a prediction unit for predicting the driver's intention of the ego vehicle to change lanes by comparing outputs of the motivator computing unit and inhibitor computing unit,
wherein the motivator computing unit is configured to determine if any of a plurality of motivator criteria for the intension of the driver of the ego vehicle are met, and the inhibitor computing unit is configured to determine if any of a plurality of inhibitor criteria for the intension of the driver of the ego vehicle are met, the prediction unit predicting the driver's intention to change lanes by comparing a number of the motivator criteria that are met with a number of the inhibitor criteria that are met, and
wherein the motivator and inhibitor are computed based on an average velocity of the current lane and an average velocity of the adjacent lane which are determined based on traffic on the current lane and the adjacent lane.

6. The system for predicting a driver's intention of an ego vehicle to change lanes according to claim 1, wherein the motivator and inhibitor are computed based on an average velocity of the current lane and an average velocity of the adjacent lane which are determined based on traffic on the current lane and the adjacent lane.

* * * * *